(12) United States Patent
Kanno et al.

(10) Patent No.: US 6,568,064 B2
(45) Date of Patent: May 27, 2003

(54) METHOD OF MANUFACTURING MOTOR YOKE

(75) Inventors: Kazunobu Kanno, Toyohashi (JP); Koichi Nakamura, Toyohashi (JP); Shinsuke Muroi, Hamamatsu (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/801,710

(22) Filed: Mar. 9, 2001

(65) Prior Publication Data
US 2001/0026106 A1 Oct. 4, 2001

(30) Foreign Application Priority Data
Mar. 30, 2000 (JP) ......................................... 2000-095080

(51) Int. Cl.⁷ .......................... H02K 15/14; B21D 22/00
(52) U.S. Cl. ............. 29/596; 29/DIG. 11; 29/DIG. 37; 29/607; 72/348; 72/349; 310/89; 310/154.12
(58) Field of Search .................. 29/596, 598, DIG. 11, 29/DIG. 37, 607; 72/349, 348, 379.4; 310/89, 154.08, 154.12

(56) References Cited
U.S. PATENT DOCUMENTS 5,083,449 A * 1/1992 Kobayashi et al. ........... 72/349
6,014,883 A * 1/2000 McClung .................. 72/349 X

FOREIGN PATENT DOCUMENTS

| JP | 58-35024 | * | 3/1983 | ................ 72/348 X |
| JP | 62-31351 | * | 2/1987 | .................. 29/596 |
| JP | A-3-265453 | | 11/1991 | |
| JP | U-5-55741 | | 7/1993 | |

* cited by examiner

Primary Examiner—A. Dexter Tugbang
(74) Attorney, Agent, or Firm—Posz & Bethards, PLC (57) ABSTRACT

In a method of manufacturing a partly flat yoke having curved circumferential walls to which magnets are to be attached and having parallel flat circumferential walls which constitute main magnetic paths and whose each radial thickness is larger than that of the curved circumferential walls, by drawing a sheet of metal plate, the metal plate is held down between a die and projections of a wrinkle preventing plate provided at given angular positions around an outer circumference of a cavity of the die so as to correspond to the curved circumferential walls. Then, a punch presses down the metal plate into the cavity so that material of the metal plate extends axially into the cavity, while the material of the metal plate flows circumferentially from each side of the curved circumferential walls to sides of the parallel flat circumferential walls.

14 Claims, 8 Drawing Sheets

METHOD OF MANUFACTURING MOTOR YOKE

CROSS REFERENCE TO RELATED APPLICATION

This application is based upon and claims the benefit of priority of Japanese Patent Application No. 2000-95080 filed on Mar. 30, 2000, the content of which is incorporated herein by reference.

BACKGROUND OF THE INVENTION

1. Field of the Invention

The present invention relates to a motor yoke and a method of manufacturing the same.

2. Description of Related Art

Conventionally, a yoke of a motor is manufactured by plastically deforming a metal plate (iron plate). The manufacturing processes are generally drawing processes (press workings) which have a plurality of steps such as a first drawing step, subsequent drawing steps and a final forming step. In the first drawing step, the plate is drawn to a nearly dome shaped body. In the subsequent drawing steps, the dome shaped body is further drawn in a manner that a diameter thereof is gradually reduced. After the yoke is formed in rough shape according to the steps mentioned above, its minor portions are further deformed to manufacture the yoke in final shape with the final forming step.

Figure 10:
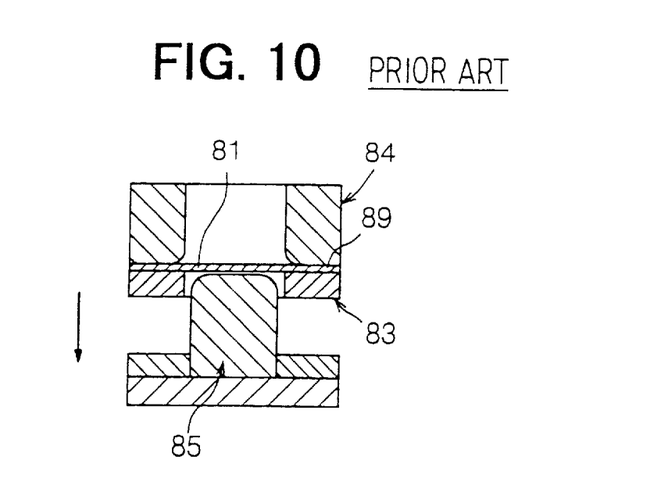
FIG. 10 is a cross sectional view of a conventional yoke manufacturing apparatus at an initial stage of a first drawing step as a prior art.

In more details, as shown in FIG. 10, while a portion 89 of a metal plate 81 around an entire outer circumference of a cavity of a die 84 is held down between a wrinkle preventing plate 83 and the die 84, a punch 85 urges a sheet of the metal plate 81 so as to be pushed into the cavity of the die 84 under constant pressure.

Figure 11A:
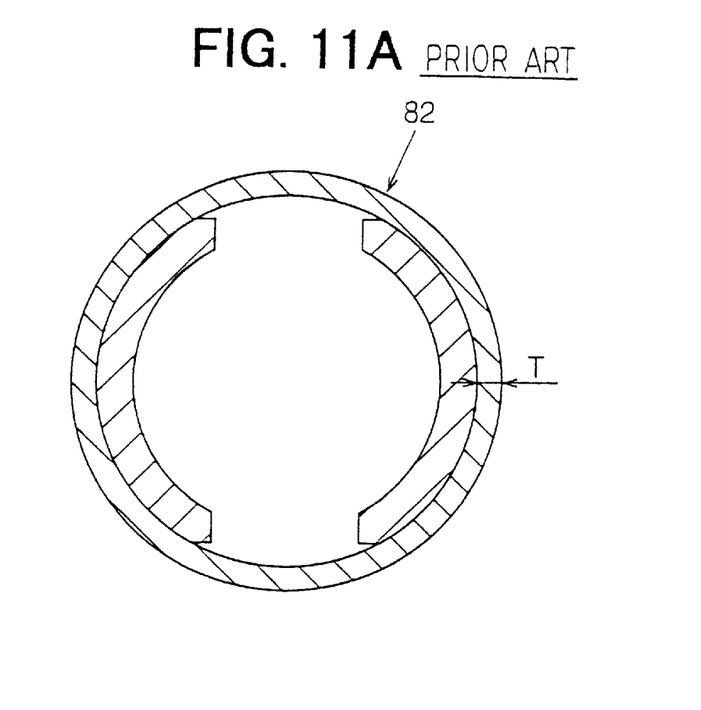
FIG. 11A is a cross sectional view of a conventional yoke as a prior art.

When the metal plate 81 is pushed to extend axially in the cavity at a drawing step, compressive stresses are induced uniformly in a circumferential direction of the metal plate 81 formed in cup shape and tensile stresses are induced uniformly in an axial direction thereof. Accordingly, as shown in FIG. 11A, a thickness T of a yoke, that is, a thickness of a cup shaped product 82 made of the metal plate 81 by drawing, is circumferentially nearly uniform.

Figure 11B:
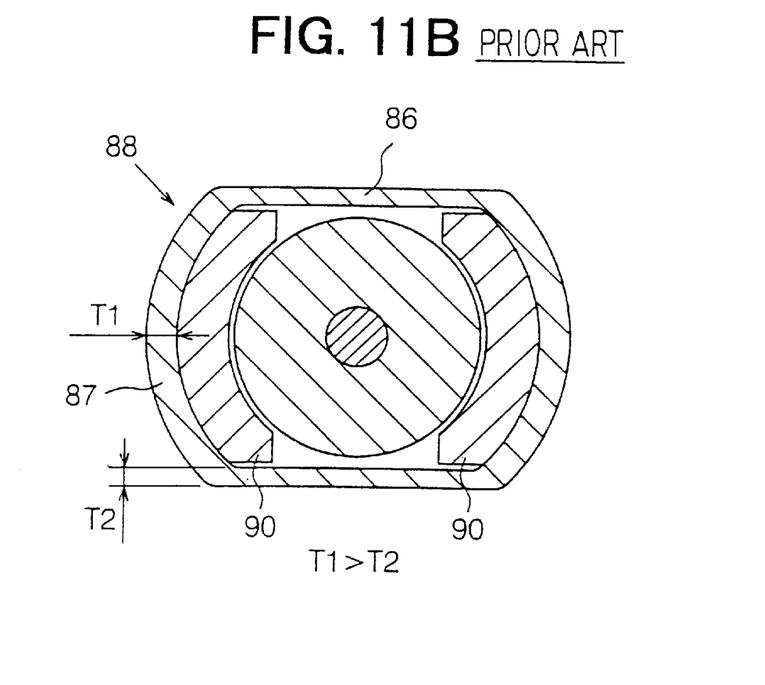
FIG. 11B is a cross sectional view of a conventional partly flat yoke as a prior art.

Further, a partly flat yoke 88, whose cross section is formed in a generally oval shape and includes parallel flat portions 86 and curved portions 87, is manufactured in such a manner that the cup shaped product 82, which is made of the metal plate 81 at the first drawing step and whose radial thickness is circumferentially uniform, is further drawn by an oval punch through the subsequent drawing steps and, then, finally shaped at the final forming step. As a diameter of the cup shaped product 82 is reduced through the drawing steps, material of the product 82 flows toward the curved portions 87. Accordingly, in the partly flat yoke 88, each thickness T1 of the curved portions 87 becomes thicker and each thickness T2 of the parallel flat portions 86 becomes thinner, as shown in FIG. 11B.

Since permanent magnets 90 are fixed to inner surfaces of the curved portions 87 of the partly flat conventional yoke and each of the curved portions 87 does not play an important role as a magnetic path of the motor, the curved portion 87 having the thicker thickness T2 results in material loss. To the contrary, each of the parallel flat portions 86 plays an important role as the magnetic path. Therefore, the parallel flat portions 86 having the thinner thickness T2 thereof cause to induce higher magnetic resistance so that a motor output (torque) is limited.

To solve the drawback mentioned above, conventionally, thickness of the parallel flat portions 86 have been controlled by employing the metal plate 81 whose original thickness is relatively thick under consideration of the subsequent thickness reduction in the drawing processes or by employing a complicated compression drawing method. However, the drawback that the curved portions 87 are still thicker than that of the parallel flat portions 86 has not been solved. As a result, manufacturing cost is higher due to the material loss and a compact and slim type motor is not realized.

SUMMARY OF THE INVENTION

An object of the invention is to provide a method of manufacturing a motor yoke having circumferential walls whose each thickness is relatively thick and to which magnets are to be attached and having circumferential walls whose each thickness is relatively thin and which play important roles as magnetic paths. Accordingly, material of the metal plate is saved and a compact, lightweight and high torque motor may be realized.

It is another aspect of the invention to provide a motor yoke manufactured by the method mentioned above.

To achieve the above objects, in a method of manufacturing a cup shaped motor yoke having circumferential walls at given angular regions to which magnets are to be attached and circumferential walls at remaining angular regions which play roles as main magnetic paths, by drawing a sheet of metal plate, the metal plate is put between a die having a cavity and a holding plate having a through-hole which is axially aligned with the cavity so that the metal plate is held down therebetween at positions around outer circumferences of the cavity and the through-hole corresponding to the given angular regions and the metal plate is placed with a clearance having a predetermined distance from one of the die and the holding plate at positions around the outer circumference of the cavity corresponding to the remaining angular regions. Then, the punch presses down the metal plate through the through-hole into the cavity so that material of the metal plate extends axially into the cavity, while the material of the metal plate flows to move in the cavity circumferentially from each side of the given angular regions to sides of the remaining angular regions. As a result, a first stage yoke, whose each thickness of the circumferential walls at the given angular regions is thinner than that at the remaining angular regions, is completed without having substantial wrinkles thereon.

Preferably, the given angular regions are located symmetrically with respect to an axial center of the cavity.

It is preferable that the metal plate is held down between the die and projections formed on a surface of the holding plate around the through-hole and each height of the projections corresponds to the predetermined distance of the clearance.

Further, for the purpose of preventing generation of wrinkles, it is preferable that the predetermined distance of the clearance falls within a range of 8 to 15 percent of the thickness of the metal plate.

Furthermore, preferably, the first stage yoke is, then, placed and held down between another die having a cavity and another holding plate having a through-hole at entire positions around the cavity and the trough-hole thereof. Diameter of the cavity of the another die is smaller than that of the die and a periphery end of the cavity of the another die on a side of facing the another holding plate has round corners. Each curvature of the round corners at positions corresponding to the given angular regions is larger than that at positions corresponding to the remaining angular regions. Then, another punch, whose diameter is smaller than that of the punch, presses down the first stage yoke through the through-hole of the another holding plate so that the wall thickness of the first stage yoke at the given angular regions become further thinner and the wall thickness thereof at the remaining angular regions become further thicker. As a result, a second stage yoke, whose diameter and depth are smaller and deeper than those of the first stage yoke, respectively, is completed.

Preferably, the curvatures of the round corners are continuously and gradually reduced from each middle point of the given angular regions toward middle points of the remaining angular regions oppositely adjacent thereto.

The cup shaped yoke may be a partly flat yoke whose circumferential wall is composed of two parallel flat walls playing roles as the main magnetic paths and two curved walls to which a pair of the permanent magnet are attached. In this case, it is preferable to manufacture the partly flat yoke with the punches and the cavities of the dies, whose cross sections are formed in oval shape.

Further, the cup shaped yoke may be a nearly cylindrical yoke whose outer shape of the circumferential wall is oval in cross section and whose inner shape of the circumferential wall is circular in cross section. The magnets are attached to inner circumferential walls on opposite end sides thereof in a major axis of oval.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

FIG. 5B1 is a cross sectional view taken along a line VB1—VB1 of FIG. 5B2;

FIG. 5B2 is a cross sectional view taken along a line VB2—VB2 of FIG. 4A;

FIG. 5C1 is a cross sectional view taken along a line VC1—VC1 of FIG. 5C2;

FIG. 5C2 is a cross sectional view taken along a line VC2—VC2 of FIG. 4B;

FIG. 5D1 is a cross sectional view taken along a line VD1—VD1 of FIG. 5D2;

FIG. 5D2 is a cross sectional view taken along a line VD2—VD2 of FIG. 4C;

FIG. 8B1 is a cross sectional view taken along a line VIIIB1—VIIIB1 of FIG. 8B2;

FIG. 8B2 is a cross sectional view of a product at a last stage of a first drawing step according to the second embodiment;

FIG. 8C1 is a cross sectional view taken along a line VIIIC1—VIIIC1 of FIG. 8C2;

FIG. 8C2 is a cross sectional view of a product at a last stage of a second drawing step according to the second embodiment;

FIG. 8D1 is a cross sectional view taken along a line VIIID1—VIIID1 of FIG. 8D2;

FIG. 8D2 is a cross sectional view of a product at a last stage of a third drawing step according to the second embodiment;

FIG. 9A1 is a front view of a modified folding plate;

FIG. 9A2 is a cross sectional view taken along a line IXA2—IXA2 of FIG. 9A1;

FIG. 9B1 is a front view of another modified folding plate;

FIG. 9B2 is a cross sectional view taken along a line IXB2—IXB2 of FIG. 9B1;

DETAILED DESCRIPTION OF THE PREFERRED EMBODIMENTS

Figure 1A:
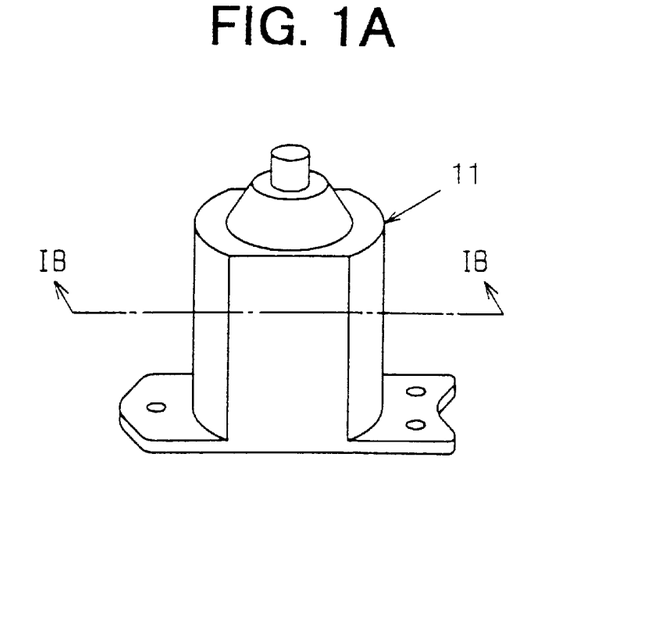
FIG. 1A is a perspective view of a partly flat yoke according to a first embodiment of the present invention.
Figure 1B:
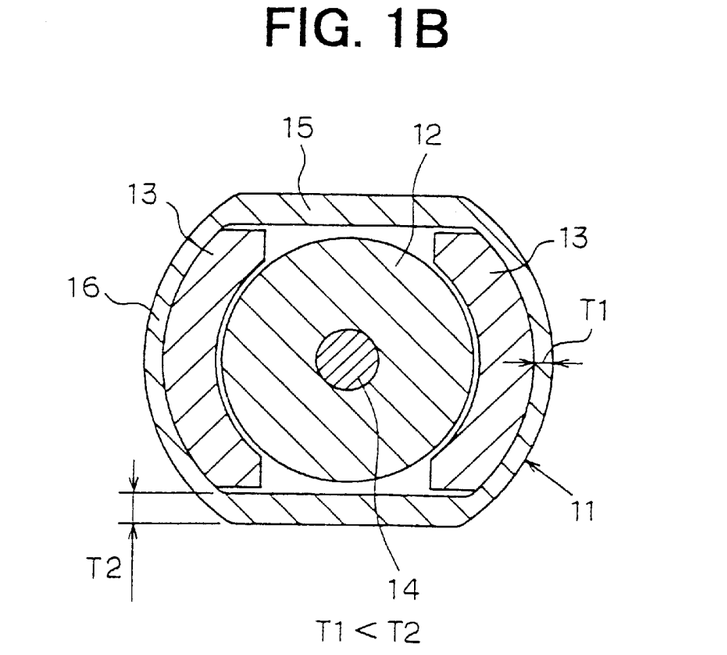
FIG. 1B is a cross sectional view taken along a line IB—IB of FIG. 1A.

A method of manufacturing a motor yoke according to a first embodiment is described with reference to FIGS. 1A to 6B. As shown in FIGS. 1A and 1B, a motor has a yoke 11, a rotor 12, a pair of permanent magnets 13, and a rotor shaft 14. A cross section of the yoke 11, which also serves as a motor case, is formed in oval shape so that the yoke has parallel flat portions 15 and curved portions 16. Each radial thickness T2 of the parallel flat portions 15 is thicker than each radial thickness T1 of the curved portions 16. The permanent magnets 13 are disposed at inner circumferential surfaces of the curved portions 16a, respectively. The parallel flat portions 15 play roles as main magnetic paths.

Next, an apparatus of manufacturing the yoke 11 is described.

Figure 2A:
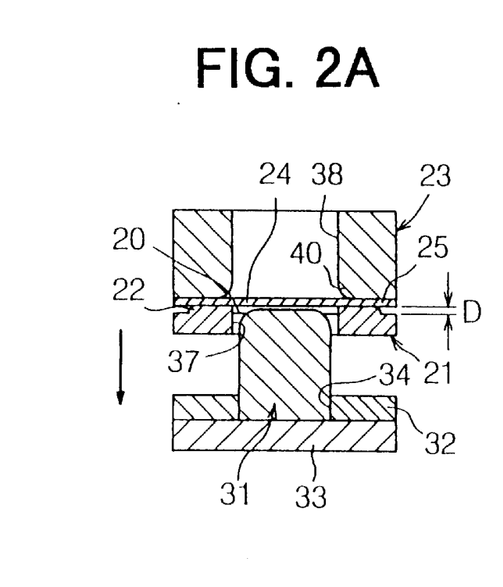
FIG. 2A is a cross sectional view of a manufacturing apparatus taken along a line IIA—IIA of FIG. 2C at an initial stage of a first drawing step according to the first embodiment.
Figure 2B:
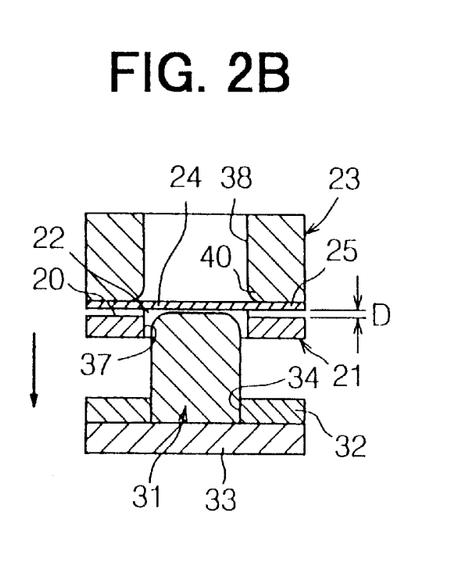
FIG. 2B is across sectional view of the manufacturing apparatus taken along a line IIB—IIB of FIG. 2C at the initial stage of the first drawing step.
Figure 2C:
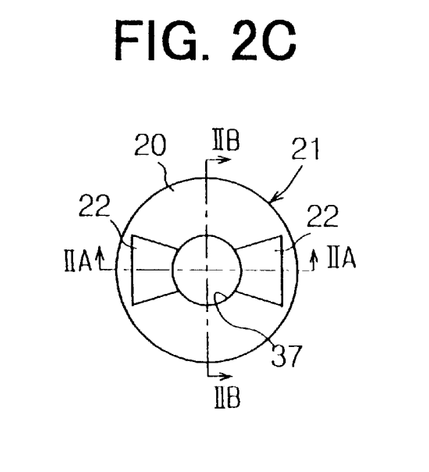
FIG. 2C is a front view of a folding plate at the first drawing step.
Figure 2D:
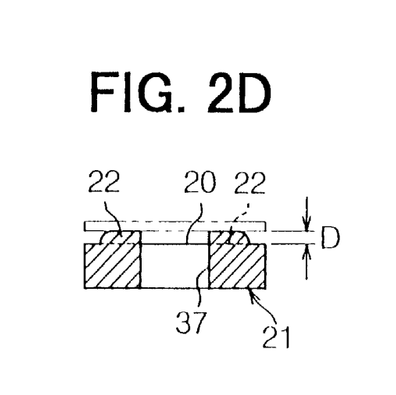
FIG. 2D is a view of the folding plate shown in FIG. 2A.

As shown in FIGS. 2A and 2B, the manufacturing apparatus of the yoke 11 is composed of a wrinkle preventing plate 21 (holding plate), a die 23, a punch 31, a punch holder 32 and a packing plate 33.

The punch 31 is formed in oval shape and is held by the punch holder 32 and the packing plate 33 in a state that the punch 31 protrudes out of a punch hole 34 provided in the punch holder 32. The die 23 is provided with a cavity 38 into which the punch 31 is inserted. Cross section of the cavity 38 is formed in oval shape. The cavity 38 is provided on an opening end side of the die 23 (on a side of facing the wrinkle preventing plate 21) with round corners 40 having predetermined curvatures.

As shown in FIGS. 2A, 2B, 2C and 2D, the wrinkle preventing plate 21 is provided with a punch guide through-hole 37 which is axially aligned with cavity 38 and whose sectional shape is same as that of the cavity 38. The wrinkle preventing plate 21 is further provided integrally on an upper surface thereof with a pair of near fan shaped projecting portions 22, which are located at positions around an outer circumference of the through-hole 37 and are symmetrical with respect to an axial center of the through-hole 37, and step portions 20 having a difference D in level from each top of the projecting portions 22. Height of the difference D in level may be decided relatively in dependence on thickness of the metal plate 24.

According to the first embodiment, the height of the difference D in level is 0.2 mm and the thickness of the metal plate 24 is 1.6 mm. A ratio of the height of the difference D in level to the thickness of the metal plate is 12.5%. An experimental test result reveals that, preferably, the height of the difference D in level falls within a range of 8 to 15% of the thickness of the metal plate 24 since, if smaller than 8%, smooth material flow of the metal plate 24 is prevented and, if larger than 15%, wrinkles on the metal plate 24 are likely to be generated.

Next, a method of manufacturing the yoke 11 is described.
(First Drawing Step)

As shown in FIG. 2A, the metal plate 24 is placed between the die 23 and the wrinkle preventing plate 21 under pressure generated by a press machine (not shown). Accordingly, circumferential portions 25 of the metal plate 24 at given angular regions are held down between the die 23 and the projecting portions 22 and those at the remaining angular ranges are placed between the die 23 and the step portions 20 with a clearance corresponding to the difference D in level between the metal plate 24 and the wrinkle preventing plate 21, as shown in FIG. 2B. The press machine gives holding pressure to the metal plate 24 at the projecting portions 22 to an extent that material of the metal plate 24 is sufficiently flown therethrough into the cavity 38 but material of the metal plate 24 is prevented from circumferentially flowing toward the projecting portions 22 when the punch 31 is inserted into the cavity 38 at a drawing step described later.

Figure 3A:
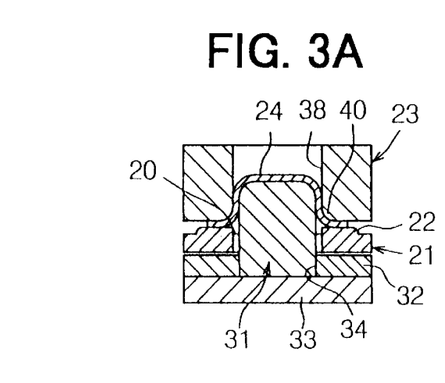
FIG. 3A is a cross sectional view of the manufacturing apparatus at a last stage of the first drawing step corresponding to FIG. 2A.
Figure 3B:
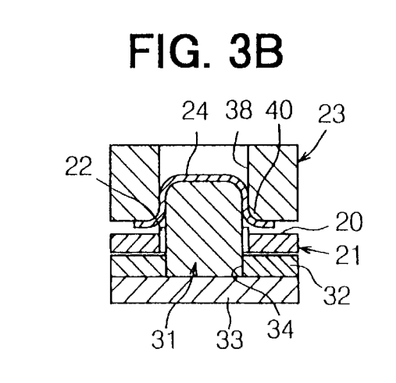
FIG. 3B is a cross sectional view of the manufacturing apparatus at the last stage of the first drawing step corresponding to FIG. 2B.
Figure 4A:
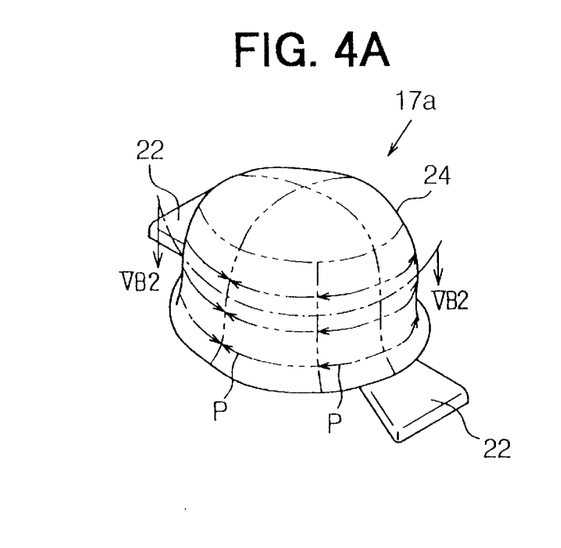
FIG. 4A is a perspective view of a product after the first drawing step according to the first embodiment.

Under the circumstances mentioned above, the punch 31 pushes the metal plate 24 to extend into the cavity 38. At this time, as shown in FIG. 3A, there exists a large drawing resistance between the metal plate 24 and the round corners 40 (surface resistance between the metal plate 24 and the die 23) at portions adjacent to the projecting portions 22 since the circumferential portion 25 at the given angular region are held between the die 23 and the projecting portions 22. On the other hand, since the circumferential portion 25 of the metal plate 24 at the remaining angular region are not held down between the wrinkle preventing plate 21 and the die 23, as shown in FIG. 3B, the drawing resistance between the metal plate 24 and the round corners 40 at portions not adjacent to the projecting portions 22 is smaller, compared with that at the portions adjacent to the projecting portions 22. Accordingly, as shown in FIG. 4A, internal stresses, which are compressive stresses acting to circumferentially urge material of the metal plate 24 from the portions adjacent to the projecting portions 22 (the given angular regions) toward the portions not adjacent to the projecting portions 22 (the remaining angular regions), are generated at the first drawing step.

Figure 5A:
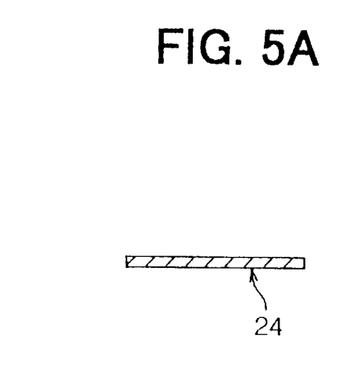
FIG. 5A is a cross sectional view of a metal plate according to the first embodiment.
Figure 5B:
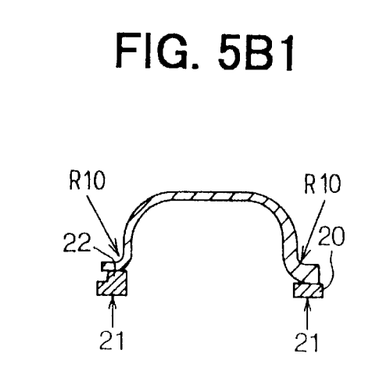
Figure 5B:
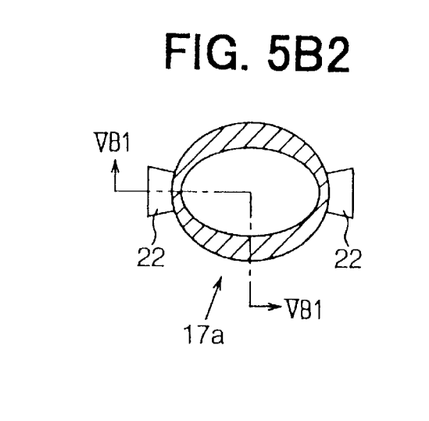

As a result, while the material of the metal plate 24 flows axially along the cavity 38, the material of the metal plate 24 flows circumferentially from the portions adjacent to the projecting portions 22 to the portions not adjacent to the projecting portions 22 so that a near dome shaped first stage product 17a, as shown in FIGS. 4A, 5B1 and 5B2, is formed. The wall thickness of the first stage product 17a is largely deviated circumferentially. That is, wall thicknesses thereof at the circumferential portions adjacent to the projecting portions 22 (at the given angular regions) are thinner than those at the portions not adjacent to the projecting portions 22 (at the remaining angular regions).

In multiple step drawing processes, the first step drawing serves to decide a tendency of material flow of the metal plate 24 in the subsequent drawing steps. Accordingly, larger internal stresses generated at the first drawing step tends to prevent the circumferential wall thickness of the yoke at the given angular regions from becoming thicker.
(The Subsequent Drawing Steps)

Figure 6A:
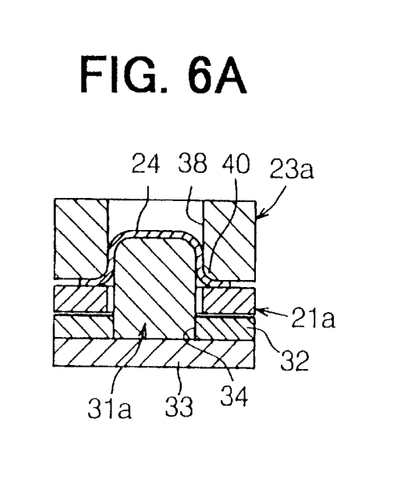
FIG. 6A is a cross sectional view of the manufacturing apparatus at a last stage of the second drawing step.
Figures 6B, 7:
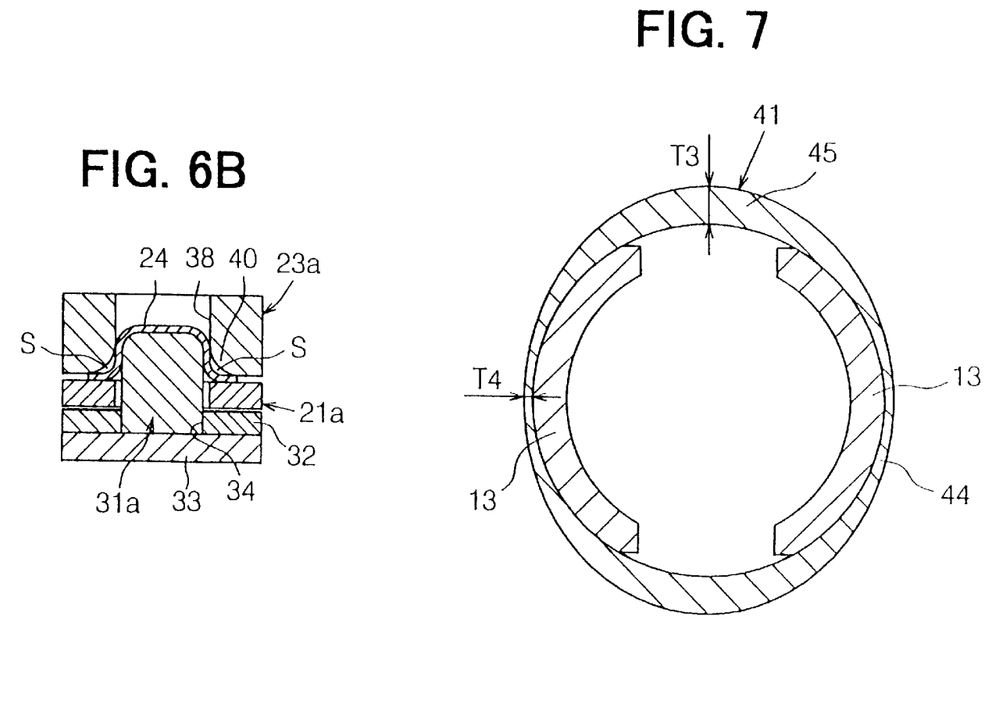
FIG. 6B is across sectional view of the manufacturing apparatus at the last stage of the second drawing step.
FIG. 7 is a cross sectional view of a cylindrical yoke according to a second embodiment of the present invention.

As shown in FIGS. 6A and 6B, a second drawing step uses a punch 31a whose diameter is smaller than the punch 31 at the first drawing step, and a wrinkle preventing plate 21a similar to the conventional wrinkle preventing plate having none of the projecting portions 22 and the step portions 20, that is, without the difference D in level. Further, curvatures of the round corners 40 of the die 23 on sides of the given angular regions (at places where thinner circumferential wall thickness of the first stage product 17a is to be formed) are smaller than those on sides of the remaining given angular regions (at places where thicker circumferential wall thickness of the first stage product 17a is to be formed). Curvatures of the round corners 40 of the dies 23 at portions bridging between the respective given and remaining angular regions are continuously changed so that the curvatures from each middle portions of the given angular regions toward middle portions of the remaining given angular regions are gradually reduced.

When the punch 31a presses the first stage product 17a to extend into the cavity of the die 23a, the drawing resistance between the round corners 40 and the metal plate 24 (the product 17a) becomes larger at the given angular regions since the curvatures at the given angular regions are relatively large and the drawing resistance between the round corners 40 and the metal plate 24 (the product 17a) becomes smaller at the remaining angular regions since the curvatures at the remaining angular regions are relatively small so that there exists a gap S, as shown in FIG. 6B, between the round corners 40 and the metal plate 24.

Figure 4B:
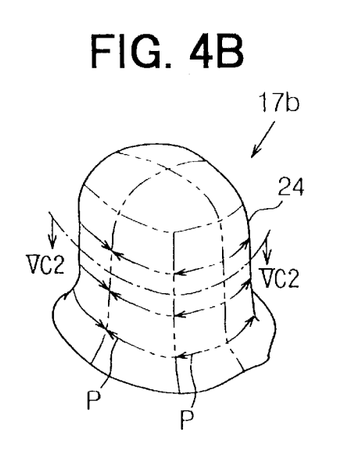
FIG. 4B is a perspective view of a product after a second drawing step.
Figure 4C:
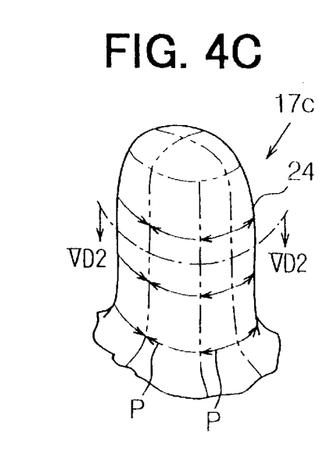
FIG. 4C is a perspective view of a product after a third drawing step.
Figure 5C:
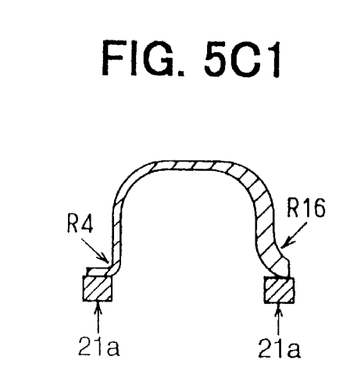
Figure 5C:
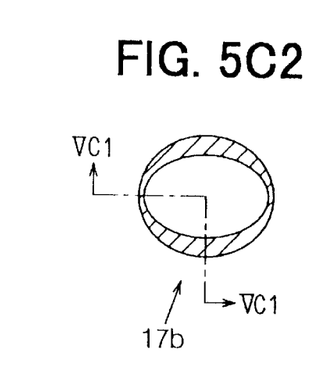

Accordingly, at the second drawing step, internal stresses acting in directions shown in FIG. 4B are induced in the metal plate 24 because the drawing resistances are different between the given and remaining angular regions. Therefore, due to the synergistic effect of the internal stresses induced at the first and second drawing steps, material of the metal plate 24 easily flow from each of the given angular regions to the remaining angular regions oppositely adjacent thereto so that a second stage product 17b, as shown in FIGS. 4B, 5C1 and 5C2, is formed. Radial thicknesses of the curved portions 16 of the second stage product 17b are much more thinner that those of the first stage product 17a.

Figure 5D:
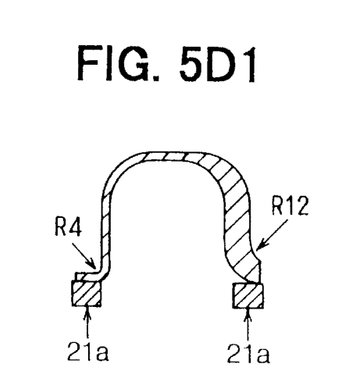
Figure 5D:
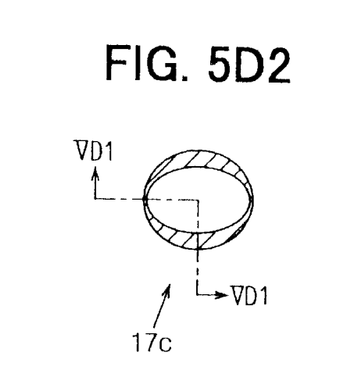

By further repeating a drawing step or drawing steps, which are similar as the second drawing step, a third stage product 17c, as shown in FIGS. 4C, 5D1 and 5D2, whose circumferential wall thickness of the curved portions 16 is further thinner, is formed on the synergistic effect of the internal stresses induced at the first and the subsequent drawing steps.

As the processes proceed from the second drawing step to the third or the subsequent drawing steps, it is preferable that diameter of the punch and the cavity of the die become smaller, the curvatures at the remaining angular regions become larger and the curvature difference between the given and remaining angular regions become smaller, as shown by respective radii R in FIGS. 5C1 and 5D1.

Then, the third stage or the subsequent stage product 17c is processed by a forming step so that minor portions of the yoke 11 are shaped as shown in FIGS. 1A and 1B. Each radial thickness of the parallel flat portions 15, which is roughly equal to the thickness of the original metal plate 24, is thicker than each radial thickness of the curved portions 16.

As mentioned above, since the radial thickness T2 of each of the parallel flat portions 15, which play roles as the main magnetic paths, is thicker than the radial thickness T1 of each of the curved portions 16, material of the metal plate 24 is saved and a compact, lightweight and high torque motor may be realized.

Further, since the fan shaped projecting portions 22 are provided integrally with the wrinkle preventing plate 21 at positions symmetrical with respect to an axial center of the hole 37 of the wrinkle preventing plate 21 in such a manner that the difference D in level is provided on the upper surface of the wrinkle preventing plate 21, the yoke 11 having the parallel flat portions 15 whose radial thickness are thicker than those of the curved portions 16 is manufactured without largely modifying the manufacturing apparatus.

Moreover, since the metal plate 24 at positions around an outer circumference of the cavity 38 corresponding to the given angular regions is held down between the die 38 and the wrinkle preventing plate 21 and the metal plate 24 at positions around an outer circumference of the cavity 38 corresponding to remaining angular regions other than the given angular regions is placed therebetween with a clearance of the distance D from the wrinkle preventing plate 21, circumferential material flow of the metal plate 24 is restricted due to the internal stresses induced, when the metal plate 24 is formed by drawing, so that the radial thicknesses of the yoke 11 differ largely between the parallel flat and curved portions 15 and 16.

(Second Embodiment)

A method of manufacturing a yoke according to a second embodiment is described with reference to FIGS. 7 to 8D2. Only structures and advantages different from those of the first embodiment are described.

FIG. 7 shows a nearly cylindrical yoke 41 whose outer shape of the circumferential wall is oval in cross section and whose inner shape of the circumferential wall is circular in cross section. The cylindrical yoke 41 has thinner thickness wall 44 and thicker thickness wall 45, which correspond to the given and remaining angular portions in the first embodiment, respectively. The magnets are attached to the inner circumferential walls on opposite end sides thereof in a major axis of oval, that is, on sides of the thinner thickness walls 44.

An apparatus of manufacturing the cylindrical yoke 41 is similar to that of the first embodiment except shapes of the punch 31 and the cavity of the die 32. Though the shapes of the punch 31 and the cavity of the die 32 are oval in the first embodiment, the shape of the punch 31 is circular and the shape of the cavity is oval near circular in the second embodiment.

Figure 8A:
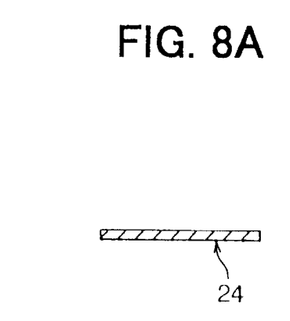
FIG. 8A is a cross sectional view of a metal plate according to the second embodiment.
Figure 8B:
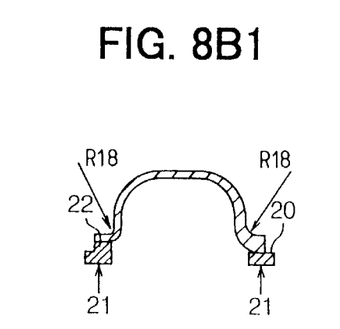
Figure 8B:
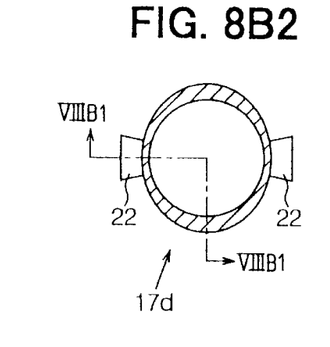
Figure 8C:
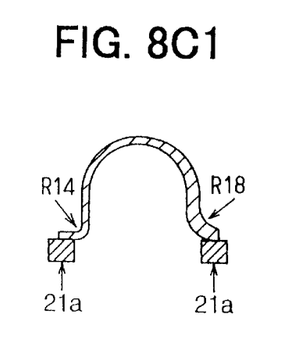
Figure 8C:
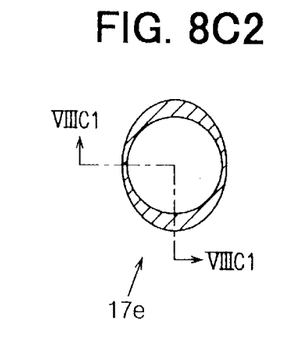
Figure 8D:
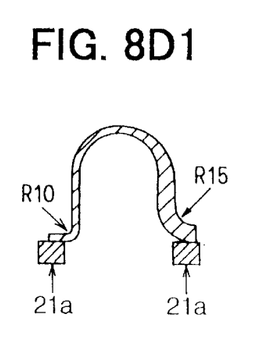
Figure 8D:
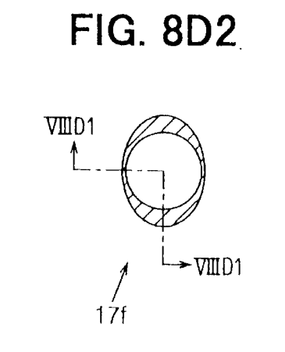

Further, as shown in FIGS. 8A to 8D2, drawing steps of the second embodiment are similar to those of the first embodiment except respective dimensions of the curvatures of the round corners of the cavity of the die at the given and remaining angular regions. Dimensions of the curvatures at the respective given and remaining angular regions and dimensional relationship of the curvatures therebetween may be decided based on how much the radial thickness of each stage product 17d, 17e or 17f at the given or remaining angular regions are reduced or increased in each of the drawing step processes.

After finishing the forming step at which minor portions are finally shaped, the cylindrical yoke 41 having thicker circumferential walls 45 whose each radial thickness is T3 and thinner circumferential walls 44 whose each radial thickness is T4 is completed, as shown in FIG. 7.

According to the second embodiment, each radial thickness T3 of the thicker circumferential walls 45 is thicker than the thickness of the metal plate 24 and each radial thickness T4 of the thinner circumferential walls 44 is thinner than the thickness of the metal plate 24. Accordingly, the thicker circumferential walls 45 is effectively used as the main magnetic paths and the permanent magnets are effectively fixed to the thinner circumferential walls 44 so that larger magnetic flux may be generated even if the cylindrical yoke 41 is relatively small. This will result in providing the lighter weight and higher torque motor.

Instead of forming the projecting portions 22 on the wrinkle preventing plate 21, as described in the first and second embodiments, the die 23 may provide on a surface thereof with the projecting portions 22.

Figures 9A, 9B:
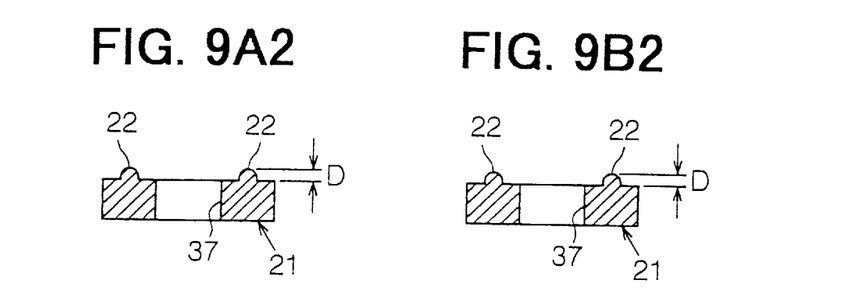
Figures 9A, 9B:
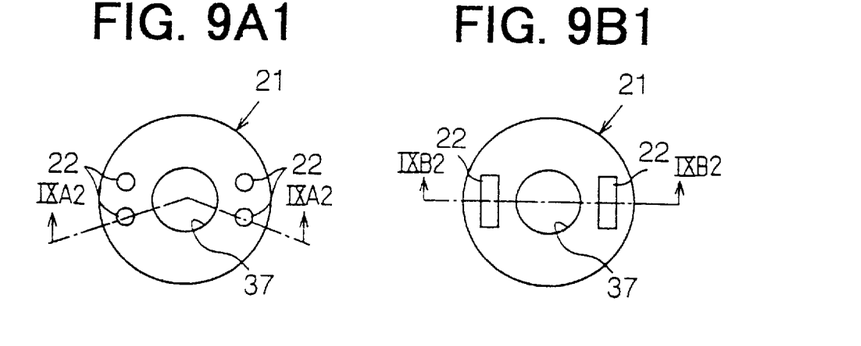

Further, the projecting portions 22 maybe a plurality of projections or a pair of ribs which are provided symmetrically with respect to the center axis of the through-hole of the wrinkle preventing plate 21 as shown in FIG. 9A.

What is claimed is:

1. A method of manufacturing a cup shaped motor yoke having circumferential walls at given angular regions for accommodating magnets and circumferential walls at remaining angular regions for forming main magnetic paths, by drawing a flat sheet of a metal plate, comprising steps of:

putting the metal plate between a die having a cavity and a holding plate having a through-hole which is axially aligned with the cavity so that the metal plate is in contact with and held down therebetween at positions around outer circumferences of the cavity and the through-hole at first and second angular regions spaced circumferentially and is loosely placed therebetween at positions around the outer circumferences of the cavity and the through-hole at third and fourth angular regions circumferentially sandwiched between the first and second angular regions, respectively, so that a clearance having a predetermined distance is provided between the metal plate and at least one of the die and the holding plate at the third and fourth angular regions, and pressing down a punch against the metal plate through the through-hole into the cavity so that material flow of the metal plate extending axially into the cavity is restricted at the first and second angular regions, while the material flow of the metal plate within the cavity moves circumferentially from each side of the first and second angular regions to sides of the third and fourth angular regions oppositely adjacent thereto to form a first cup having a circumferential wall, whereby each thickness of the circumferential wall of the first cup formed by passing through the first and second angular regions, which corresponds to the circumferential wall of the yoke at the given angular regions is thinner than that formed by passing through the third and fourth angular regions, which corresponds to the circumferential wall of the yoke at the remaining angular regions.

2. The method of manufacturing the cup shaped motor yoke according to claim 1, wherein the first and second angular regions are located symmetrically with respect to an axial center of the cavity.

3. The method of manufacturing the cup shaped motor yoke according to claim 1, further comprising providing the holding plate on a surface facing the die around the through-hole with projections so that the metal plate is held down between the die and the projections and each height of the projections corresponds to the predetermined distance of the clearance.

4. The method of manufacturing the cup shaped motor yoke according to claim 1, wherein the predetermined distance of the clearance falls within a range of 8 to 15 percent of a thickness of the metal plate.

5. The method of manufacturing the cup shaped motor yoke according to claim 1, further comprising steps of:
holding down the first cup between another holding plate having a through-hole and another die with a cavity whose diameter is smaller than that of the die and whose periphery end on a side facing the another holding plate has round corners so that each curvature of the round corners at circumferential positions where the circumferential walls of the first cup corresponding to the given angular regions is larger than that at circumferential positions where the circumferential walls of the first cup corresponding to the remaining angular regions are arranged, and
pressing down another punch, whose diameter is smaller than that of the punch, against the first cup through the through-hole of the another holding plate so that each thickness of the circumferential walls of the first cup corresponding to the given angular regions are further thinned and each thickness of the circumferential walls thereof corresponding to the remaining angular regions are further thickened.

6. The method of manufacturing the cup shaped motor yoke according to claim 5, wherein the curvatures of the round corners are continuously and gradually reduced form each circumferential middle point of positions where the circumferential walls of the first cup corresponding to the given angular regions are arranged toward circumferential middle points of positions where the circumferential walls of the first cup corresponding to the remaining angular regions are arranged.

7. A method of manufacturing a cup shaped motor yoke having an inner circumference to which permanent magnets are to be attached, made of a metal sheet having a substantially uniform thickness, comprising:
sandwiching the metal sheet between a first die having a cavity and an opposing first holding plate having a through-hole that is axially aligned with the cavity, at least one of the first die and the first holding plate being provided with steps formed by a plurality of circumferentially-spaced projections having substantially identical heights, the plurality of projections extending toward one of the first die and the first holding plate, so that the metal sheet is in contact with and held down between the projections and the one of the first die and the first holding plate not having the projections, while a space equal to each height of the projections is provided between the metal sheet and the one of the first die and the first holding plate not having the projections;
pressing down a punch against the metal sheet through the through-hole into the cavity, whereby the metal sheet is drawn to form a first cup having first circumferential walls formed by passing through opposed faces of the first die and the first holding plate positioned at and near the projections and second circumferential walls formed by passing through the opposed faces of the first die and the first holding plate not positioned at and near the projections so that each thickness of the first circumferential walls of the first cup is thinner than that of the second circumferential walls of the first cup, as a drawing resistance of the metal sheet passing through the opposed faces of the first die and the first holding plate positioned at and near the projections is higher than a drawing resistance of the metal sheet that is not positioned at and near the projections.

8. The method of claim 7, further comprising providing the projections at locations that are symmetrical with respect to an axial center of the cavity.

9. The method of claim 7, further comprising:
holding down the first cup between a second holding plate having a through-hole and a second die having a cavity whose peripheral end on a side facing the second holding plate has round corners, each curvature of the round corners being larger at circumferential positions corresponding to the first circumferential walls of the first cup than at circumferential positions corresponding to the second circumferential walls of the first cup; and
pressing down a second punch against the first cup through the through-hole of the second holding plate to form a second cup having third circumferential walls, each thickness of which is thinner than that of the first circumferential walls of the first cup, and fourth circumferential walls, each thickness of which is thicker than that of the second circumferential walls of the first cup.

10. The method of claim 9, wherein the curvatures of the round corners are continuously and gradually reduced from each middle point of the circumferential positions corresponding to the first circumferential walls of the first cup toward middle points of the circumferential positions corresponding to the second circumferential walls of the first cup.

11. The method of claim 10, wherein an outer circumferential shape of the third and fourth circumferential walls of the second cup is oval in cross section and an inner circumferential shape thereof is circular in cross section and the third circumferential walls are positioned on opposite sides in a direction of a major oval axis and the fourth circumferential walls are positioned on opposite sides in a direction of a minor oval axis.

12. The method of claim 9, wherein the permanent magnets are to be attached to inner surfaces of the third circumferential walls of the second cup.

13. The method of claim 9, wherein the third circumferential walls of the second cup are arc-shaped and curved in opposite directions, and the fourth circumferential walls of the second cup are parallel and flat.

14. The method of claim 7, wherein the heights of the respective projections fall within a range of 8 to 15 percent of the thickness of the metal sheet.

* * * * *